United States Patent
Schleif et al.

(10) Patent No.: US 9,698,579 B2
(45) Date of Patent: Jul. 4, 2017

(54) METHOD FOR ROUTING WIRE BUNDLES FROM A ROTOR SHAFT OF A TURBOMACHINE

(71) Applicant: General Electric Company, Schenectady, NY (US)

(72) Inventors: Kurt Kramer Schleif, Greenville, SC (US); Donald W. Shaw, Simpsonville, SC (US); Zachary John Snider, Simpsonville, SC (US); Mario Joseph Arceneaux, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 189 days.

(21) Appl. No.: 14/522,624

(22) Filed: Oct. 24, 2014

(65) Prior Publication Data

US 2016/0118777 A1    Apr. 28, 2016

(51) Int. Cl.
*H02G 1/08* (2006.01)
*F01D 17/06* (2006.01)
*F01D 17/08* (2006.01)
*F01D 21/00* (2006.01)

(52) U.S. Cl.
CPC .............. *H02G 1/08* (2013.01); *F01D 17/06* (2013.01); *F01D 17/08* (2013.01); *F01D 21/003* (2013.01); *F05B 2240/61* (2013.01); *F05D 2220/30* (2013.01); *F05D 2240/60* (2013.01); *F05D 2260/83* (2013.01); *Y10T 29/49012* (2015.01); *Y10T 29/49169* (2015.01); *Y10T 29/49194* (2015.01)

(58) Field of Classification Search
CPC  H02G 1/08; F01D 17/06; F01D 17/08; F01D 21/003; F05D 2220/30; F05D 2240/60; F05D 2240/61; F05D 2260/83; F05B 2240/60; F05B 2240/61; Y10T 29/49012; Y10T 29/49169; Y10T 29/49194; Y10T 29/46012
See application file for complete search history.

(56) References Cited

U.S. PATENT DOCUMENTS

| | | | | |
|---|---|---|---|---|
| 2008/0207389 | A1* | 8/2008 | Fahrenbach | F05B 2240/61 475/344 |
| 2009/0179428 | A1* | 7/2009 | Achenbach | F05B 2240/61 290/55 |
| 2010/0007144 | A1* | 1/2010 | Nigam | F05B 2240/61 290/44 |
| 2010/0021309 | A1* | 1/2010 | Hennig | F05B 2240/60 416/244 R |

FOREIGN PATENT DOCUMENTS

JP              11155780 A   *  6/1999

* cited by examiner

*Primary Examiner* — A. Dexter Tugbang
(74) *Attorney, Agent, or Firm* — Dority & Manning, PA

(57) ABSTRACT

A method for routing wires from a rotor shaft of a turbomachine includes routing a plurality of wire bundles through an end portion of the rotor shaft and into an annular extension shaft which is coupled to the end portion of the rotor shaft, threading each wire bundle through a corresponding thru-hole of a plurality of thru-holes defined in an annular wire barrel, inserting the wire barrel into the extension shaft and fixedly connecting the wire barrel to the extension shaft.

10 Claims, 7 Drawing Sheets

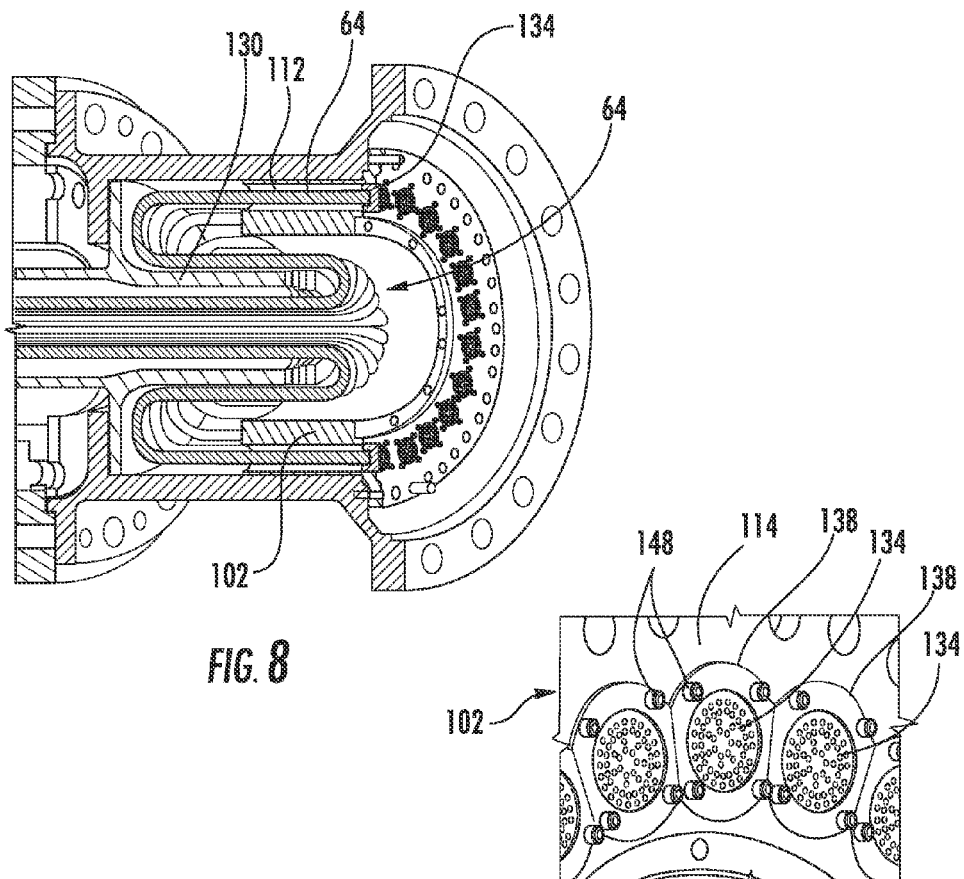
FIG. 8
FIG. 9
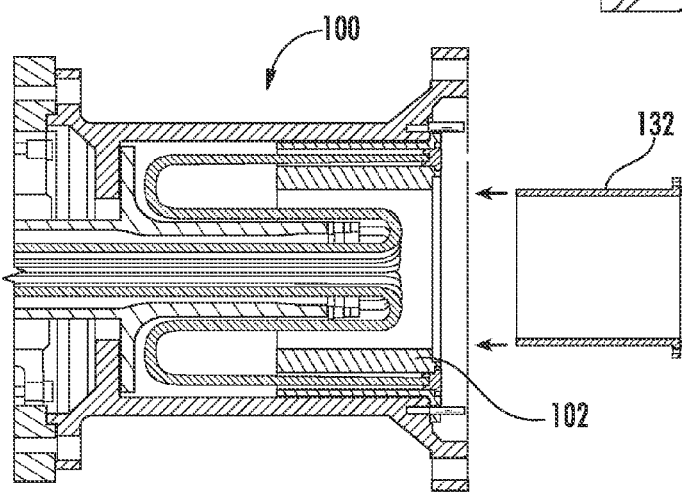
FIG. 10

METHOD FOR ROUTING WIRE BUNDLES FROM A ROTOR SHAFT OF A TURBOMACHINE

FIELD OF THE INVENTION

The present invention generally involves a turbomachine having a plurality of wire bundles coupled at one end to various rotatable sensors which are disposed within the turbomachine. More specifically, the present invention involves a method for routing the wire bundles out of the turbomachine for connection to a slip ring, data processor, controller or the like.

BACKGROUND OF THE INVENTION

Turbomachines such as wind turbines, gas turbines, steam turbines, pumps, fans, generators, motors, and other forms of commercial equipment frequently include shafts, blades, and other rotating components. It is known in the art to install one or more sensors on the rotating components to measure various characteristics of those components in order to control, monitor, and/or enhance the operation of the rotating components. For example, sensors that measure temperature, velocity, stress, strain, vibrations, and/or other characteristics of the rotating components may allow for early detection of abnormalities, adjustments to repair or maintenance schedules, and/or other actions to enhance operations.

The sensors may be electronically coupled to a controller or data processing device via one or more wire bundles which extend through an inner passage defined within the rotor shaft. The wire bundles rotate with the rotor shaft during operation of the turbomachine. Various slip ring and telemetry systems are known in the art for transmitting the sensor data from the rotating components to stator components for further analysis. In many cases, the number of sensors and corresponding wires may number in the hundreds or thousands.

Conventionally, the multitude of wires in the wire bundle(s) are manually fixed or connected to a single or common printed circuit board commonly known as a tack board. Although this configuration and connection method has high reliability, it can be tedious, non-serviceable, and non-repairable, can be difficult to mate to other components and typically limits the number of sensors which may be used. In addition, the wire bundle(s) are generally subjected to g-loads which may impact the integrity of the connections and or the individual wires within the wire bundle(s). Therefore, an improved method for routing the wires out of the rotor shaft for connection to the controller, data processor or the like would be useful.

BRIEF DESCRIPTION OF THE INVENTION

Aspects and advantages of the invention are set forth below in the following description, or may be obvious from the description, or may be learned through practice of the invention.

One embodiment of the present invention is a method for routing wire bundles from a rotor shaft of a turbomachine. The method includes routing a plurality of wire bundles through an end portion of the rotor shaft and into an annular extension shaft which is coupled to the end portion of the rotor shaft, threading each wire bundle through a corresponding thru-hole of a plurality of thru-holes defined in an annular wire barrel, inserting the wire barrel into the extension shaft and fixedly connecting the wire barrel to the extension shaft.

Another embodiment of the present invention is a method for routing wire bundles from a rotor shaft of a turbomachine. The method includes routing the wire bundles out of an inner passage of the rotor shaft into an annular extension shaft, inserting each wire bundle through a corresponding thru-hole of a plurality of thru-holes defined within an annular wire barrel such that a terminal end of each wire bundle extends out of the corresponding thru-hole outwardly from an aft wall of the wire barrel. The method further includes inserting the wire barrel into the extension shaft such that the wire barrel is concentric with the extension shaft. The method also includes connecting the terminal end of each wire bundle to a corresponding connector, guiding each wire bundle into its corresponding thru-hole and seating or attaching each connector into its corresponding thru-hole.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 8 is an exploded view of a portion of the system as shown in FIG. 3, according to various embodiments of the present invention;

FIG. 9 is an exploded view of a portion of the system as shown in FIG. 3, according to various embodiments of the present invention;

FIG. 10 is an exploded view of a portion of the system as shown in FIG. 3, according to various embodiments of the present invention;

DETAILED DESCRIPTION OF THE INVENTION

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a gas turbine for purposes of illustration, one of ordinary skill in the art will readily appreciate that embodiments of the present invention may be applied to any turbomachine such as a steam turbine, a wind turbine, a fan or the like which includes multiple wire bundles which extend out from a rotating shaft and the specification is not intended to be limited to a gas turbine turbomachine unless otherwise specified in the claims.

Figure 1:
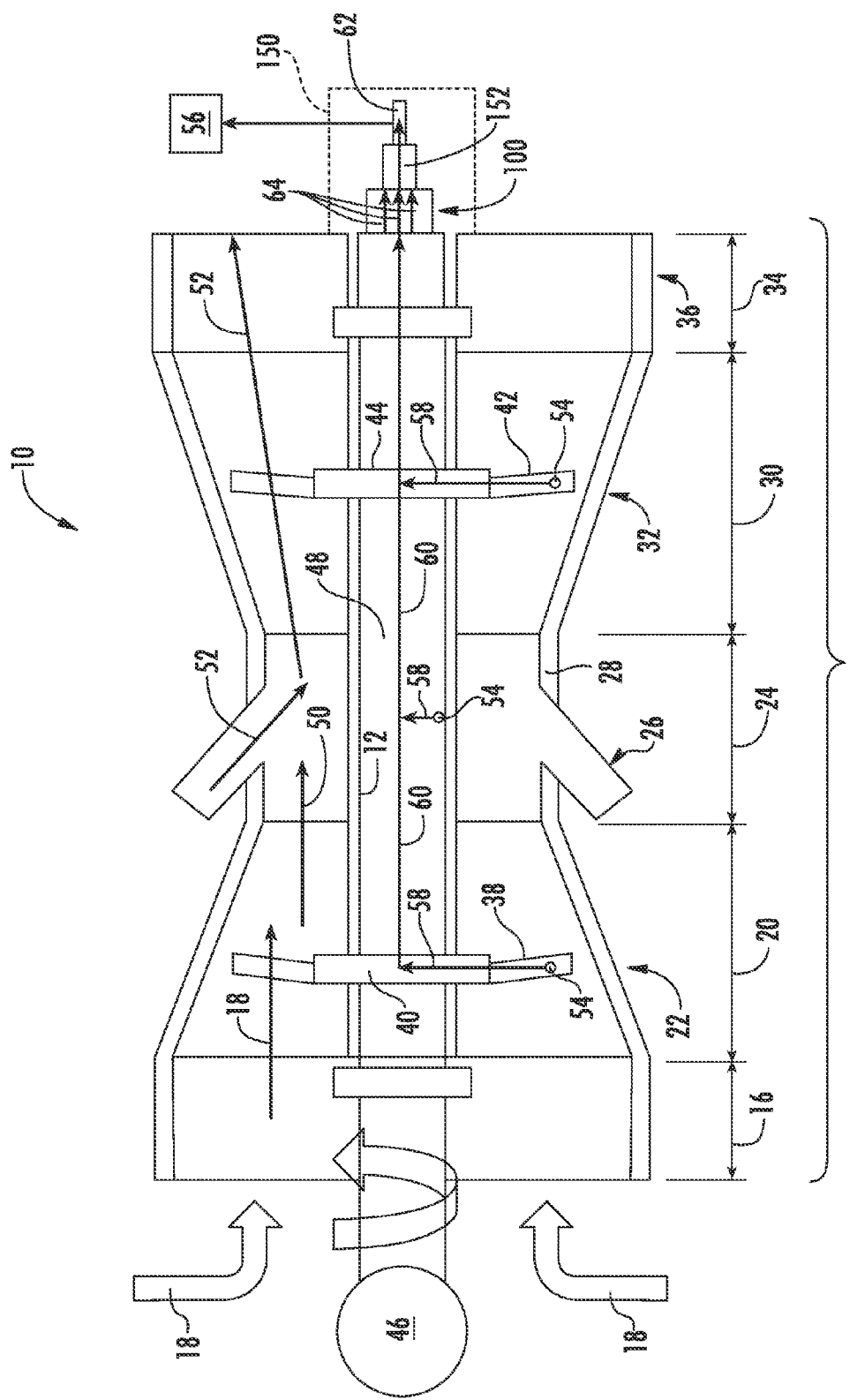
FIG. 1 is a functional block diagram of an exemplary turbomachine having a rotor shaft which extends along an axial centerline of the turbomachine as may be incorporated into various embodiments of the present invention.

Referring now to the drawings, wherein identical numerals indicate the same elements throughout the figures, FIG. 1 provides a functional block diagram of an exemplary turbomachine 10 having a rotor shaft 12 which extends along an axial centerline of the turbomachine 10. In particular embodiments, as shown in FIG. 1 the turbomachine 10 is a gas turbine 14. The gas turbine 14 generally includes an inlet section 16 that may include a series of filters, cooling coils, moisture separators, and/or other devices (not shown) to purify and otherwise condition air 18 entering the gas turbine 14. A compressor section 20 including a compressor 22 is disposed downstream from the inlet section 16. A combustion section 24 is disposed downstream from the compressor section 20 and may include a plurality of combustors 26 annularly arranged around an outer casing 28 such as a compressor discharge casing.

A turbine section 30 including a high and/or low pressure turbine 32 is disposed downstream from the combustion section 24. The gas turbine 14 may also include an exhaust section 34 which includes an exhaust duct or diffuser 36 which is disposed downstream from an outlet of the turbine 32. In particular embodiments, the inlet section 16, compressor 22, the combustion section 24, turbine 32 and the exhaust duct 36 define a primary flow passage through the gas turbine 12.

The compressor 20 generally includes multiple rows or stages of compressor blades 38 (only one stage shown) where each row of compressor blades 38 is coupled to the rotor shaft 12 via a compressor rotor disk 40. In addition, the turbine 32 generally includes multiple rows or stages of turbine blades 42 (only one stage shown) where each row of turbine blades is coupled to the rotor shaft 12 via a turbine rotor disk 44. The compressor and turbine blades 38, 42 are generally mounted, angled and/or formed such that rotation of the rotor shaft 12 causes the air 18 to be drawn through the inlet section 16 and into the compressor 22. Although illustrated as counter-clockwise, the rotational direction may be either clockwise or counter-clockwise depending on the configuration of the compressor and turbine blades 38, 42.

The rotor shaft 12 may be connected to a motor and/or a generator 46 in order to turn the rotor shaft 12 and/or to generate electrical power and/or mechanical work. The rotor shaft 12 may be a single shaft or may include multiple shafts coupled together to form a singular shaft through the turbomachine 10 or gas turbine 14. In particular embodiments, the rotor shaft 12 is annularly shaped to form or define an inner passage 48 which extends axially therethrough.

In operation, air 18 is drawn through the inlet section 16 and into the compressor 22 where it is progressively compressed so as to provide compressed air 50 to the combustion section 24. The compressed air 50 is routed to the combustors 26 where it is mixed with a fuel. The fuel-air mixture in each combustor 26 is burned, thus generating high temperature combustion gases 52 at a high velocity. The combustion gases 52 are routed through the turbine 32 where thermal and kinetic energy are transferred from the combustion gases 52 to the turbine blades 42, thus causing the rotor shaft 12 to rotate. The combustion gases 52 are exhausted through the exhaust duct 36.

During operation of a turbomachine 10 such as the gas turbine 14 described herein, the various rotatable components such as the compressor blades 38, the compressor rotor disks 40, the turbine blades 42, the turbine rotor disks 44, the rotor shaft 12 and various other rotatable turbomachine components are exposed to extreme temperatures as well potentially life limiting mechanical stresses. As a result, it is generally desirable to monitor various operating parameters such as temperature, velocity, stress, strain, vibrations, and/or other characteristics of the rotating components which may allow for early detection of abnormalities, allow for adjustments to repair or maintenance schedules, and/or other actions to enhance operation and/or efficiency of the turbomachine 10.

In order to monitor the various operating parameters at the various rotatable components, sensors 54 may be coupled to or disposed proximate to the various rotatable components within the turbomachine 10. The sensors 54 may comprise pressure detectors, strain gauges, or accelerometers that generate one or more signals reflective of vibrations or movement by the compressor blades 38, turbine blades 42, or other rotating components. In other embodiments, the sensors 54 may comprise thermocouples or resistance temperature detectors that generate one or more signals reflective of the temperature of the various rotating components. One of ordinary skill in the art will readily appreciate that embodiments of the present invention are not limited to any particular sensor unless specifically recited in the claims.

In particular embodiments, the sensors 54 may be placed on the compressor blades 38, the compressor rotor disks 40, the turbine blades 42, the turbine rotor disks 44, within the inner passage 48 of the rotor shaft 12, etc. Signals are transmitted from the sensors 54 to a data processor 56 such as a controller or computing device via individual wires 58. Each wire 58 is connected at one end to a corresponding sensor 54. The wires 58 are routed generally axially through the inner passage 48 defined within the rotor shaft 12. Due to the large number of sensors 54 and corresponding wires 58, it may be desirable to bundle the individual wires 58 into one or more common wire runs or legs 60 which extend within the inner passage 48 of the rotor shaft 12. The sensors 54 and the common wire runs 60 rotate with the rotor shaft 12. Therefore, it is necessary to electronically couple a terminating end of the common wire run 60 to a slip ring 62 or other device which allows for transmission of the signals from the rotating components to the data processor 56.

Figure 2:
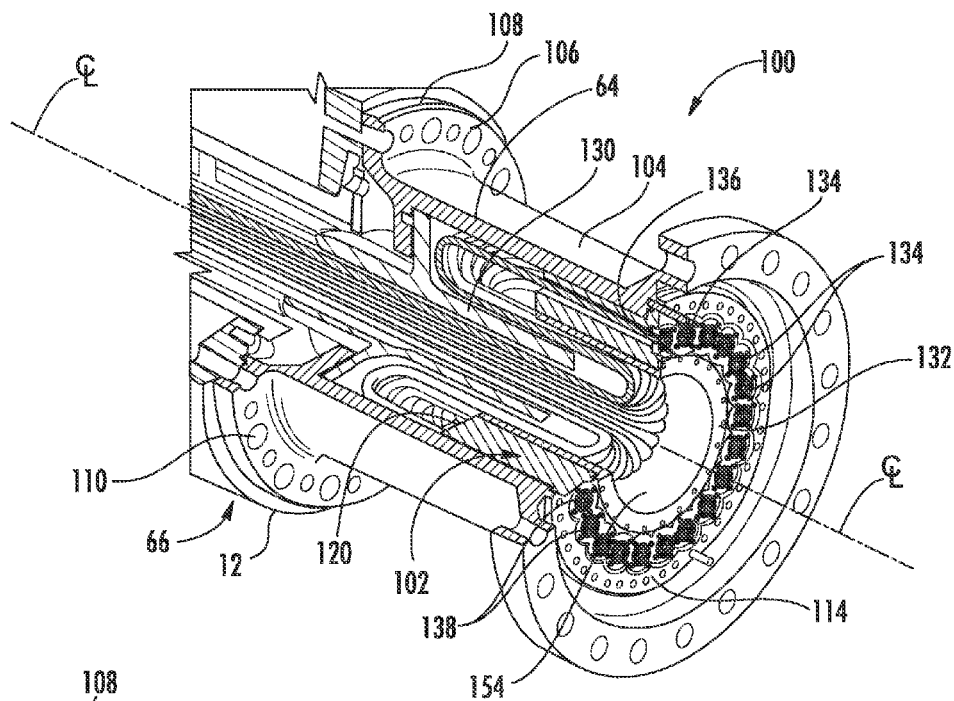
FIG. 2 is a partial cut away perspective view of a system for routing multiple wire bundles out of a rotor shaft of a turbomachine according to various embodiments of the present invention.
Figure 3:
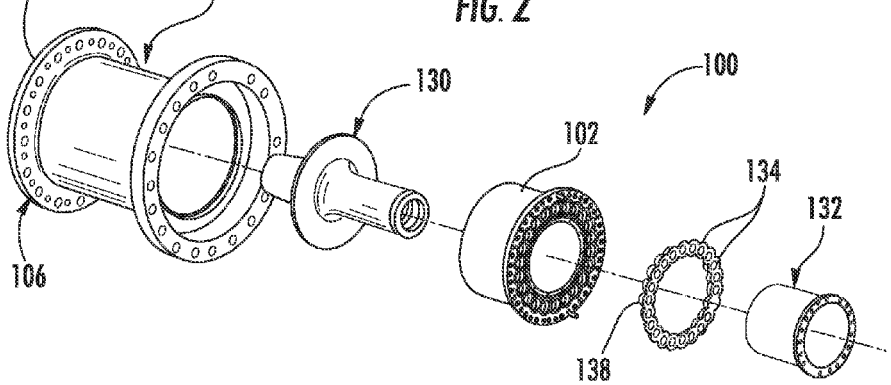
FIG. 3 is an exploded view of various components of the system as shown in FIG. 2, according to various embodiments of the present invention.

FIG. 2 provides a partial cut away perspective view of a system 100 for routing the wires 58 out of the rotor shaft 12 of the turbomachine 10, herein referred to as "system", for connection to the slip ring 62 or other stationary device. FIG. 3 provides an exploded view of various components of the system 100 according to various embodiments of the present invention.

As shown in FIGS. 1 and 2, the wires 58 of the common wire run 60 may be divided into multiple wire bundles 64 each comprising a portion of the wires 58 of the common wire run 60. The wire bundles 64 generally extend axially outwardly from the inner passage 48 of the rotor shaft 12.

In various embodiments, as shown in FIGS. 2 and 3 collectively, the system 100 may include an annular wire barrel 102 which is coupled to an end portion 66 (FIG. 2) of the rotor shaft 12. In particular embodiments, as shown in FIG. 2, the wire barrel 102 may be coupled to the end portion 66 of the rotor shaft 12 via an annular extension shaft 104. The extension shaft 104 is coaxially aligned with the rotor shaft 12 and the wire barrel 102.

As shown in FIGS. 2 and 3, the extension shaft 104 may be configured to connect at a first end 106 to the rotor shaft 12. For example, the extension shaft 104 may include a flange portion 108 which extends radially outwardly and at least partially circumferentially around the first end 106 of the extension shaft 104. The flange 108 may define a plurality of fastener holes 110 for bolting or otherwise connecting the extension shaft 104 to the end portion 66 of the rotor shaft 12. In alternate embodiments, the extension shaft 104 may be welded or otherwise fixedly connected to the rotor shaft 12.

Figure 4:
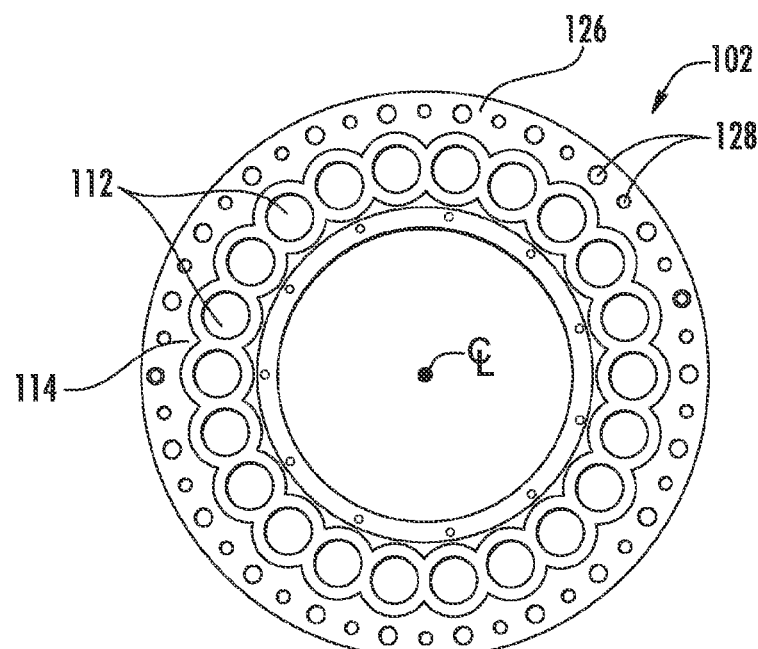
FIG. 4 is an enlarged from view of an exemplary wire barrel of the system as shown in FIG. 3, according to various embodiments of the present invention.
Figure 5:
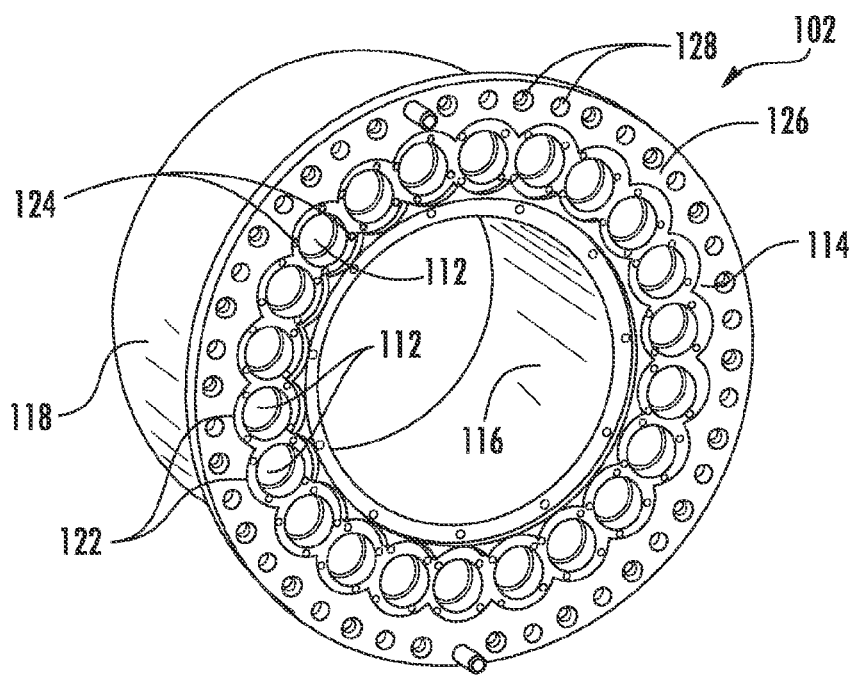
FIG. 5 is a perspective view of the wire barrel as shown in FIG. 4, according to various embodiments of the present invention.

FIG. 4 provides an enlarged from view of the wire barrel 102 according to various embodiments of the present invention. FIG. 5 provides a perspective view of the wire barrel 102 as shown in FIG. 4. As shown in FIGS. 4 and 5, the wire barrel 102 includes a plurality of thru-holes 112. The thru-holes 112 may be defined within and/or by the wire barrel 102. In particular embodiments, as illustrated in FIGS. 4 and 5, each thru-hole 112 extends through an aft wall 114 of the wire barrel 102. As provided in FIG. 5, the thru-holes 112 extend between an inner side 116 and an outer side 118 of the wire barrel 102. In particular embodiments, as shown in FIG. 2, the thru-holes 112 extend through a forward wall 120 and the aft wall 114 of the wire barrel 102.

As illustrated in FIG. 4, the plurality of thru-holes 112 is annularly arranged within the wire barrel 102 with respect to an axil centerline of the wire barrel 102, such that each thru-hole 112 is circumferentially spaced from adjacent thru-holes 112. In particular embodiments, as illustrated in FIG. 5, the aft wall 114 is recessed or defines a recessed portion 122 around each thru-hole 112. One or more threaded holes 124 may be circumferentially spaced around each or at least some of the thru-holes 112 along the aft wall 114. The threaded holes 124 may be formed within the recessed portions 122 of the aft wall 114.

In particular embodiments, the wire barrel 102 is configured to connect or couple to the extension shaft 104. For example, as shown in FIGS. 4 and 5, the wire barrel 102 may include a flange portion 126 which extends radially outwardly from the thru-holes 112. A plurality of axially oriented holes 128 may be defined in the flange portion 126 for receiving a fastener and/or alignment pin for connecting and/or aligning the wire barrel to the extension shaft 104.

In particular embodiments, as shown in FIGS. 2 and 3 the system 100 includes an annular shaped swage seal 130. The swage seal 130 may be coupled to the end portion 66 of the rotor shaft 12 directly, or as illustrated in FIG. 2, may be coupled via the extension shaft 104. The swage seal 130 is substantially coaxially aligned with the rotor shaft 12, the wire barrel 102 and/or the extension shaft 104. The swage seal 130 is generally sized to extend axially within the extension shaft 104 and at least partially axially through the wire barrel 102. The swage seal 130 may prevent or restrict cooling air from flowing out of the inner passage 48 of the rotor shaft 12.

In particular embodiments, as illustrated in FIGS. 2 and 3, the system 100 may include an annular inner sleeve 132. The inner sleeve 132 is generally formed to be seated within the wire barrel 102. The inner sleeve 132 may be fixedly connected to the wire barrel 102 via various mechanical fasteners such as bolts or the like and/or may be press fit into the wire barrel 102. The inner sleeve 132 may also be formed to allow the swage seal 130 to extend at least partially axially therethrough.

In various embodiments, as shown in FIGS. 2 and 3, the system 100 further includes a plurality of connectors 134. As shown in FIG. 2, each connector 134 is connected to a terminal end 136 of a corresponding wire bundle 64. Each connector 134 is sized so as to extend at least partially inside a corresponding thru-hole 112 of the wire barrel 102.

In particular embodiments, the system 100 includes a plurality of retention collars 138. The retention collars 138 are configured to at least partially circumferentially surround a corresponding thru-hole 112 along the aft wall 114 of the wire barrel. In particular embodiments, the retention collars 138 are formed to fit within the recessed portion 122 of the aft wall 114. The retention collars 138 may be held in position via mechanical fasteners such as bolts or the like. The retention collars 138 may serve to hold the connectors 134 into position within the corresponding thru-holes 112.

Figure 6:
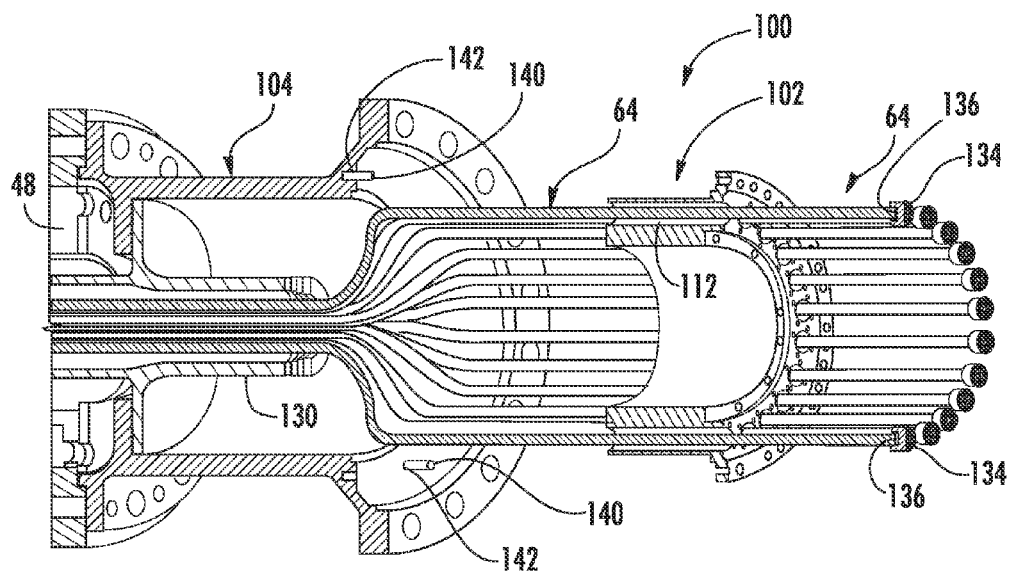
FIG. 6 is an exploded view of a portion of the system as shown in FIG. 3, according to various embodiments of the present invention.

FIGS. 6, 7, 8, 9, 10, 11 and 12 illustrate the system 100 at various stages of assembly according to various embodiments of the present invention. For example, as shown in FIG. 6, each wire bundle 64 may be routed through a corresponding thru-hole 112 of the wire barrel 102. In particular embodiments, the wire bundles 64 may be routed from the inner passage 48 of the rotor shaft 12 through the swage seal 130 before being routed through the thru-holes 112 of the wire barrel 102. The terminal end 136 of each wire bundle 64 may be coupled to a corresponding connector 134. One or more alignment pins 140 may be inserted into corresponding holes 142 defined within the extension shaft 104. The alignment pins 130 and/or holes 132 are formed so as to coaxially align with a corresponding hole 128 of the wire barrel 102.

Figure 7:
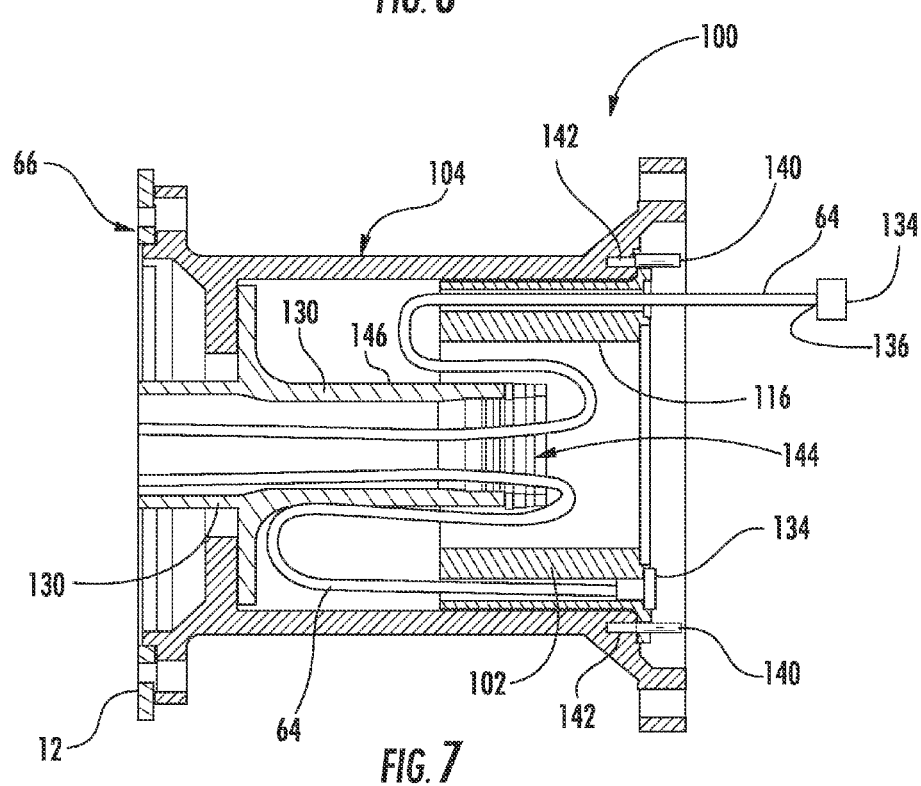
FIG. 7 is an exploded view of a portion of the system as shown in FIG. 3, according to various embodiments of the present invention.

As shown in FIG. 7, the wire barrel 102 may be inserted or guided into the extension shaft 104. The alignment pins 140 may be used to ensure proper alignment of the wire barrel 102 within the extension shaft 104 and/or to prevent entanglement or twisting of the individual wire bundles 64. In particular embodiments, as shown in FIG. 7, each wire bundle 64 will exit an end 144 of the swage seal 130, bend back so as to extend in an opposite or opposing axial direction towards the end portion 66 of the rotor 12. Each wire bundle 64 extends between an outer surface 146 of the swage seal 130 and the inner side 116 of the wire barrel 102.

As shown in FIG. 8, each wire bundle 64 may then be slid into its corresponding thru-hole 112 such that the connector 134 is at least partially inserted into the thru-hole 112. As shown, each wire bundle 64 will rest between the swage seal 130 and the wire barrel 102 without crimping. As shown in FIG. 9, the retention collars 138 may be fixed or connected to the aft wall 114 of the wire barrel 102 via mechanical fasteners 148 such as bolts, screws or the like, thus securing the connectors 134 to the aft wall 114 of the wire barrel 102. Each retention collar 138 may at least partially circumferentially surround a respective connector 134.

As shown in FIG. 10, the inner sleeve 132 may be inserted into the wire barrel 102, thus reducing a radial gap formed between the swage seal 130 and the wire barrel 102. The inner sleeve 132 may held into position via mechanical fasteners and/or via press or interference fit. As shown in FIG. 2, the inner sleeve 132 may restrict and/or prevent radial movement of the wire bundles 64 which may result due to centrifugal forces which may act on the wire bundles during rotation of the rotor shaft 12. As a result, the integrity of the wire connections may be maintained, thus enhancing the performance of the system 100. In particular embodiments, the inner sleeve 132 may be cooled prior to allow for instillation into the wire barrel 102.

In particular embodiments, as illustrated in FIG. 1, the system 100 may be included as a rotatable component of a slip ring assembly 150. As shown in FIG. 2, the extension shaft 104 may be coupled at a first end 106 to the end portion 66 of the rotor shaft 12 and as shown in FIG. 1, at a second end to a digital slip ring carrier 152 and/or to the slip ring 62. Each connector 134 may be connected to a complementary connector (not shown) of the digital slip ring carrier 152.

Figure 11:
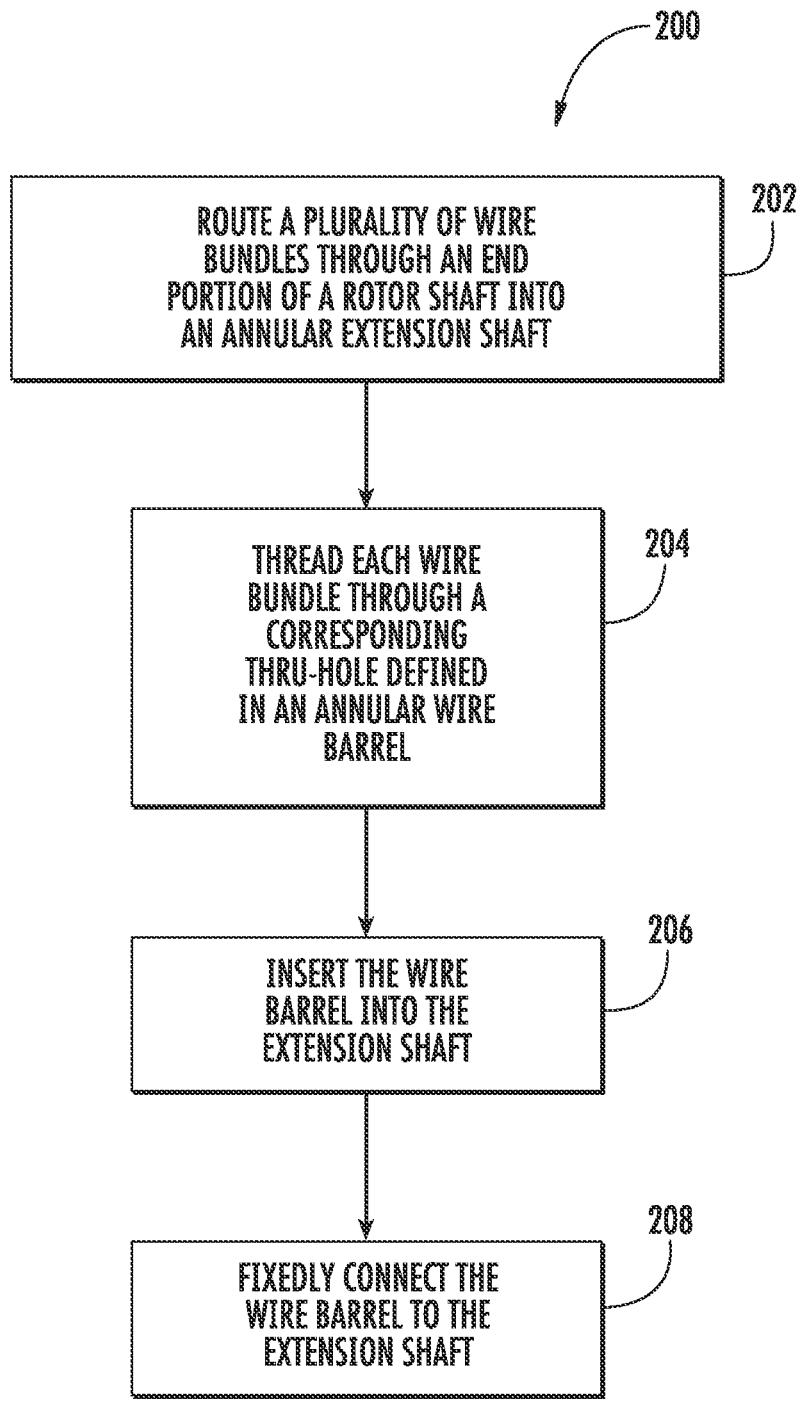
FIG. 11 provides a block diagram of an exemplary method for routing wire bundles from a rotor shaft of a turbomachine, according to one embodiment of the present invention.

FIG. 11 provides a block diagram of an exemplary method 200 for routing wires from a rotor shaft of a turbomachine according to one embodiment of the present invention. The steps of method 200 may be carried out in any order and are not limited to the order in which they appear unless specifically recited within the claims. At step 202, method 200 includes routing the plurality of wire bundles 64 through the end portion 66 of the rotor shaft 12 and into the annular extension shaft 104. At step 204, method 200 includes threading each wire bundle 64 through a corresponding thru-hole 112 of the plurality of thru-holes 112 defined in the annular wire barrel 102. At step 206, method 200 includes inserting the wire barrel 102 into the extension shaft 104. At step 208, method 200 includes fixedly connecting the wire barrel 102 to the extension shaft 104.

In other embodiments, method 200 may include guiding each wire bundle 64 individually into the corresponding thru-hole 112 towards the open end portion 66 of the rotor shaft 12 such that each wire bundle 64 forms a U-shaped bend within the extension shaft 104. Method 200 may include coaxially aligning the wire barrel 102 with the extension shaft 104 via one or more alignment pins 140. Method 200 may include connecting the terminal end 136 of each wire bundle 64 to a corresponding connector 134. In certain embodiments method 200 may include securing one or more of the connectors 134 to the aft wall 114 of the wire barrel 102 via a retention collar 138. In one embodiment method 200 may include inserting the annular inner sleeve 132 into the wire barrel 102. In one embodiment, the annular inner sleeve 132 may be inserted into the wire barrel 102 by cooling the inner sleeve 132 prior to insertion into the wire barrel 102. This will result in an interference fit once the inner sleeve reaches room temperature.

In certain embodiments, method 200 may include routing the plurality of the wire bundles 64 through the swage seal 130 which is concentrically mounted within the extension shaft 104. In one embodiment, method 200 may include inserting then annular inner sleeve 132 into the wire barrel 102, wherein the wire bundles 64 extend between an inner surface 154 (FIG. 2) of the inner sleeve 132 and the outer surface 146 of the swage seal 130.

Figure 12:
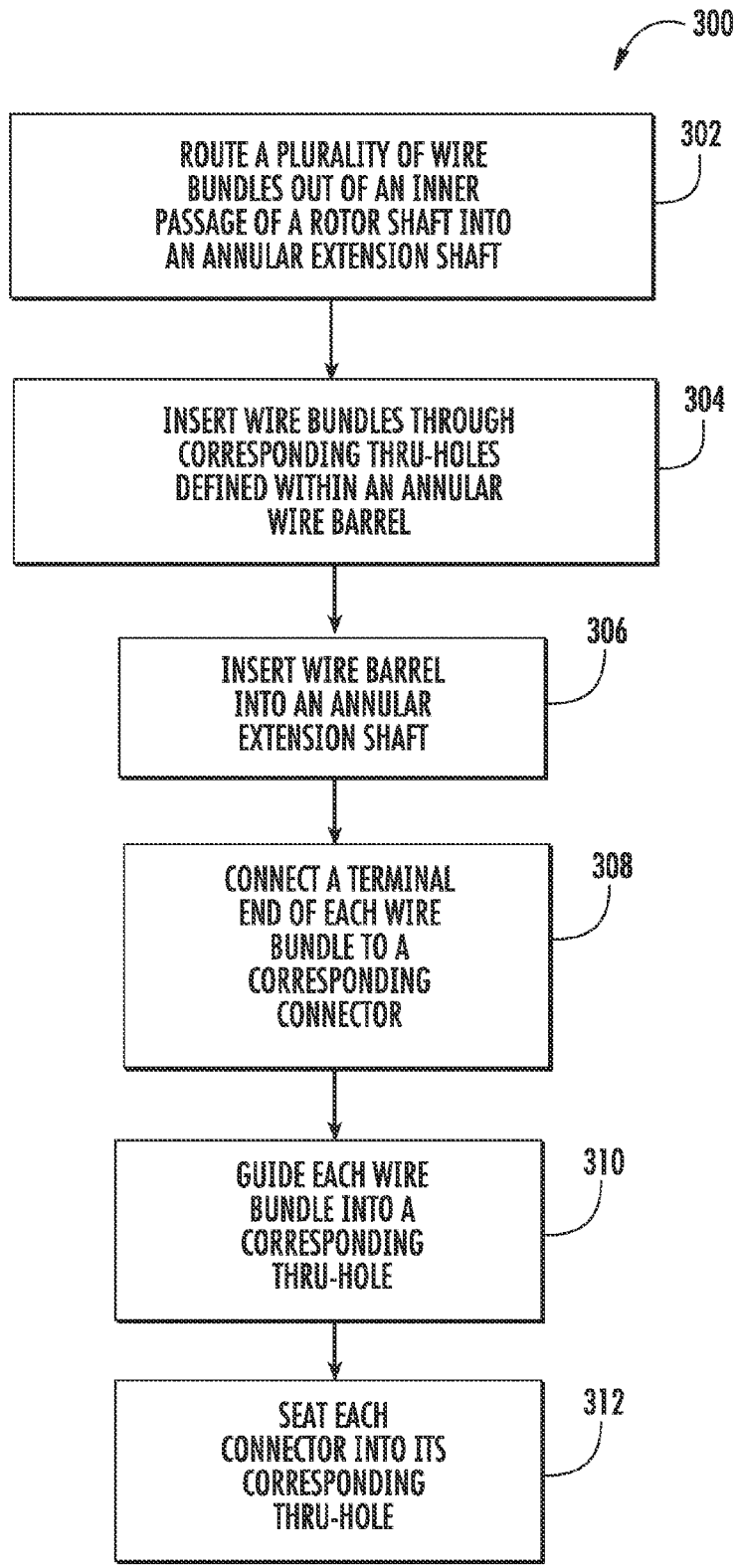
FIG. 12 provides a block diagram of an exemplary method for routing wires from a rotor shaft of a turbomachine according to one embodiment of the present invention.

FIG. 12 provides a block diagram of an exemplary method 300 for routing wires from a rotor shaft of a turbomachine according to one embodiment of the present invention. The steps of method 300 may be carried out in any order and are not limited to the order in which they appear unless specifically recited within the claims. At step 302, method 300 includes routing the wire bundles 64 out of the inner passage 48 of the rotor shaft 12 and into the annular extension shaft 104. At step 304, method 300 includes inserting each wire bundle 64 through a corresponding thru-hole 112 of the plurality of thru-holes 112 defined within the annular wire barrel 102 such that a terminal end 136 of each wire bundle 64 extends out of the corresponding thru-hole 112 outwardly from the aft wall 114 of the wire barrel 102. At step 306, method 300 includes inserting the wire barrel 102 into the extension shaft 104, wherein the wire barrel 102 is concentric with the extension shaft 104. At step 308, method 300 includes connecting the terminal end 136 of each wire bundle 64 to a corresponding connector 134. At step 310, method 300 includes guiding each wire bundle 64 into its corresponding thru-hole 112. At step 312, Method 300 includes seating each connector 134 into its corresponding thru-hole 112.

In various embodiments, method 300 may also include any or all of the following steps. For example, method 300 may include guiding each wire bundle 64 individually into its corresponding thru-hole 112 towards the end portion 66 of the rotor shaft 12 such that each wire bundle 64 forms a U-shaped bend within the extension shaft 104. Method 300 may include coaxially aligning the wire barrel 102 with the extension shaft 104 via one or more of the alignment pins 140. Method 300 also may include securing one or more of the connectors 134 to the aft wall 114 of the wire barrel 102 via a retention collar 138. Method 300 may include inserting the annular inner sleeve 132 into the wire barrel 102, for example, by cooling the inner sleeve 132 prior to insertion into the wire barrel 102.

Method 300 may also include routing the wire bundles 64 through the swage seal 130 which is concentrically mounted within the extension shaft 104. Method 300 may include inserting the annular inner sleeve 132 into the wire barrel 102 where the wire bundles 64 extend between the inner surface 154 of the inner sleeve 132 and the outer surface 146 of the swage seal 130.

The method provided herein provides various technological benefits over existing wire bundle routing methods. The generally serpentine routing of the wire bundles 64 creates slack in the wire bundles 64 within the extension shaft 104. The slack allows for extension and retraction of the wire bundles 64 when attaching the connectors 134 to a mating component such as the slip ring 62. When retracted, the wire bundles 64 remain segregated by the wire barrel 102 which prevents the wire bundles 64 from entangling or kinking. The various components of the system such as the wire barrel 102, the swage seal 130 and/or the inner sleeve 132 are positioned or aligned such that the wire bundles 64 are supported along the length of the wire bundles 64 while under g-loads which result from rotation of the rotor shaft. Division of the common wire run 60 into the smaller or individual wire bundles 64 simplifies wire termination at the connectors 134, thus improving assembly time and reducing assembly complexity. In addition, this configuration allows for a large number of sensors 54 which can be wired in a smaller packaging space (in comparison to traditional wire termination methods).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A method for routing wires from a rotor shaft of a turbomachine, comprising:
   routing a plurality of wire bundles through an end portion of the rotor shaft and into an annular extension shaft coupled to the end portion of the rotor shaft;
   threading each wire bundle through a corresponding through hole of a plurality of through holes defined in an annular wire barrel;
   inserting the annular wire barrel into the extension shaft such that each wire bundle reverses axial direction within the annular extension shaft at least two times with respect to a centerline of the annular wire barrel; and
   fixedly connecting the wire barrel to the annular extension shaft.

2. The method as in claim 1, further comprising guiding each wire bundle individually into the corresponding through hole towards the open end of the rotor shaft such that each wire bundle forms a U-shaped bend within the extension shaft.

3. The method as in claim 1, further comprising coaxially aligning the annular wire barrel with the annular extension shaft via one or more alignment pins.

4. The method as in claim 1, further comprising connecting a terminal end of each wire bundle to a connector.

5. The method as in claim 4, further comprising securing one or more of the connectors to an aft wall of the annular wire barrel via a retention collar.

6. The method as in claim 1, further comprising inserting an annular inner sleeve into the wire barrel.

7. The method as in claim 6, wherein inserting the annular inner sleeve into the annular wire barrel further includes cooling the annular inner sleeve prior to insertion into the annular wire barrel.

8. The method as in claim 1, wherein routing the plurality of wire bundles through the end portion of the rotor shaft and into the annular extension shaft includes routing the wire bundles through a swage seal which is concentrically mounted within the annular extension shaft.

9. The method as in claim 8, further comprising inserting an annular inner sleeve into the annular wire barrel, wherein the wire bundles extend between an inner surface of the annular inner sleeve and an outer surface of the swage seal.

10. The method as in claim 1, wherein each wire bundle comprises a plurality of wires, wherein each wire is connected to a sensor at one end of the wire and wherein the sensor is coupled to a rotatable component of the turbomachine.

* * * * *